Figure 1:
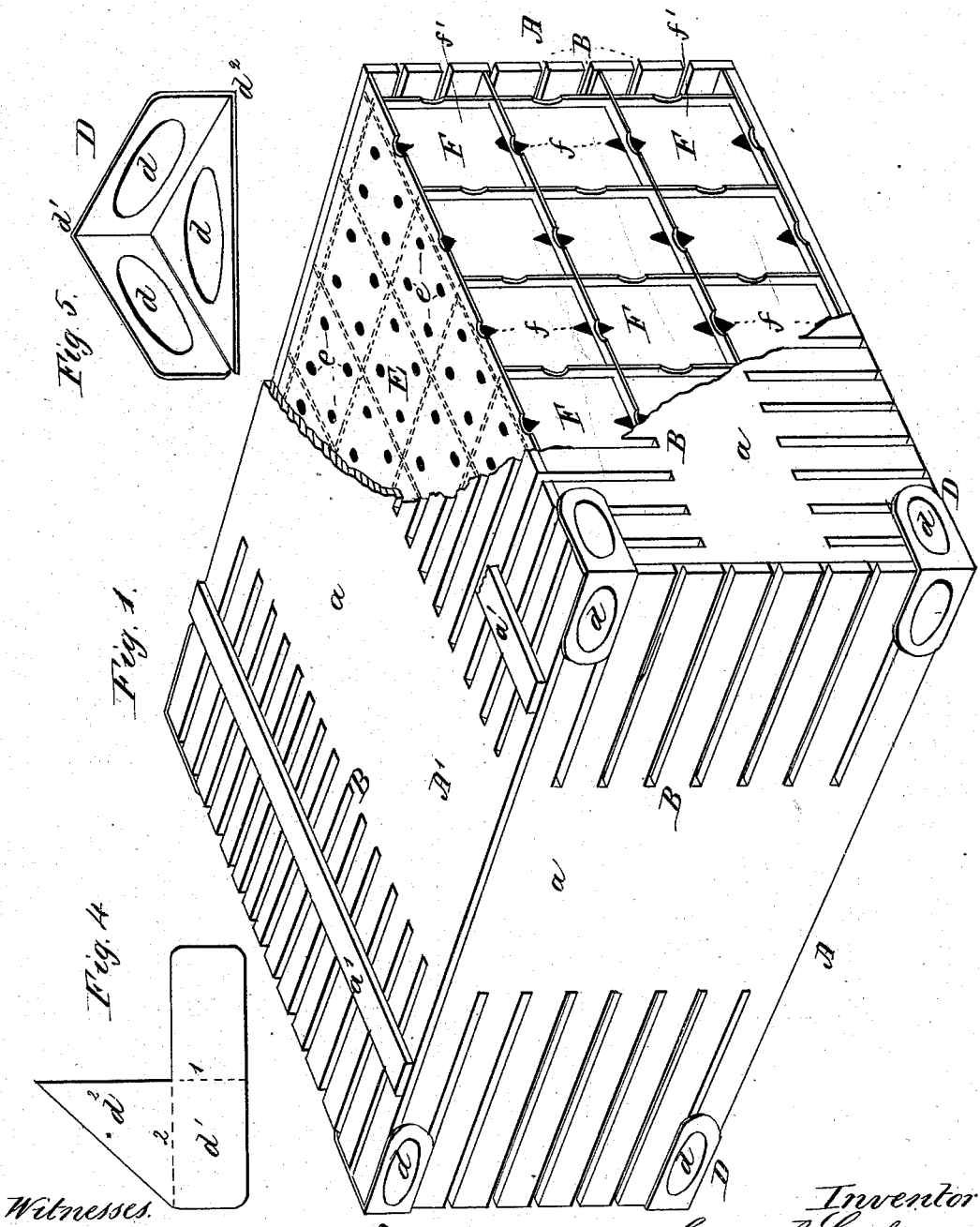

(Model.)

3 Sheets—Sheet 1.

G. A. COCHRANE.
FRUIT OR VEGETABLE CRATE OR CARRIER.

No. 258,220. Patented May 23, 1882.

Witnesses.
Wm A. McElwee.
W. Burris

Inventor
George A. Cochrane
pr Henry Orth
Atty.

(Model.)

3 Sheets—Sheet 2.

G. A. COCHRANE.
FRUIT OR VEGETABLE CRATE OR CARRIER.

No. 258,220.

Patented May 23, 1882.

Witnesses
Wm. A. McElwee.
W. T. Burres

Inventor
George A. Cochrane
per Henry Orth
att'y

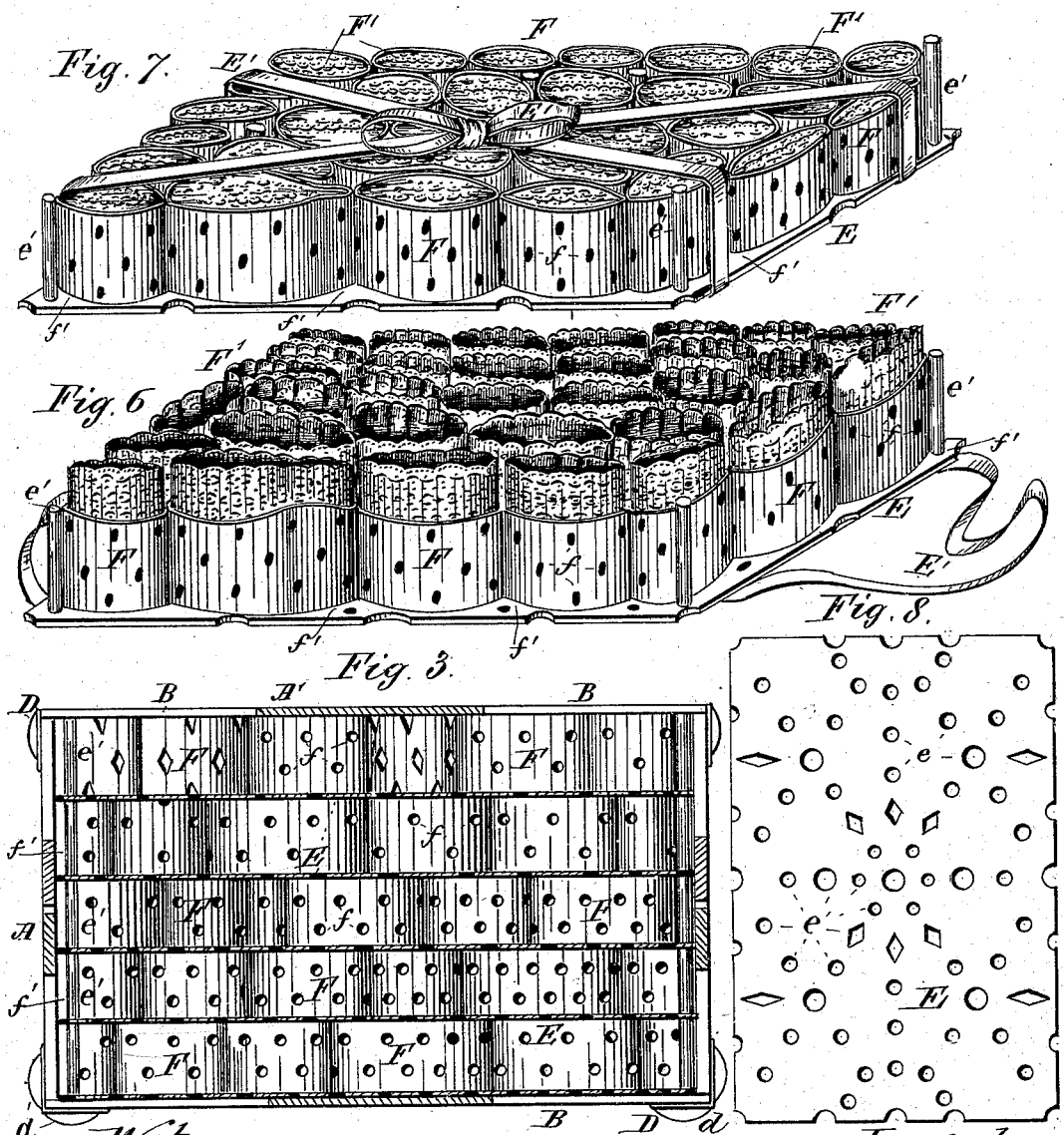

UNITED STATES PATENT OFFICE.

GEORGE A. COCHRANE, OF LIVERPOOL, COUNTY OF LANCASTER, ENGLAND.

FRUIT OR VEGETABLE CRATE OR CARRIER.

SPECIFICATION forming part of Letters Patent No. 258,220, dated May 23, 1882.

Application filed December 16, 1881. (Model.) Patented in England June 24, 1881, No. 2,756, and December 24, 1881, No. 5,647; in France July 6, 1881; in Spain July 6, 1881; and in Canada July 31, 1881; reissued March 29, 1882, Nos. 13,194 and 14,506.

*To all whom it may concern:*

Be it known that I, GEORGE A. COCHRANE, a citizen of the United States, residing at Liverpool, in the county of Lancaster and Kingdom of Great Britain, have invented certain new and useful Improvements in Fruit or Vegetable Crates or Carriers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
The object of this invention is to provide means whereby the extensive losses arising from bruising, decomposition, &c., in transporting or storing fruit, vegetables, and analogous products may be, if not entirely, at least in a large measure, avoided.

When fruit or vegetables are considered as living matter, which they are, it is essentially necessary that they should be treated as such, if their life is to be prolonged after they have been severed from the parent branch or vine or stalk.

Carbonic-acid gas, it is well known, is the great life-destroyer, both animal and vegetable, and as all such living matter exhales carbonic-acid gas it is essential that to prolong life these emanations should be removed, since death will surely result from an exposure to these gases.

In an application for patent now pending before the United States Patent Office I have described a process for treating fruit and vegetables to prolong their life after being cut or plucked from the parent stock, and have there also described some of the means essential to such treatment, and the present invention relates to one of the elements necessary to this treatment—namely, a packing box or crate that shall embody, first, the necessary requirements for the perfect drainage or elimination of the deleterious gases emanating from the substances packed therein, upon whatever side said box may lie or stand, or in whatever quantities said boxes may be piled together; secondly, it shall embody in its constructions features that will as far as possible prevent the bruising of the articles packed therein during the handling of the crate; and, lastly, it shall be so constructed that it may be turned upon any one of its sides or ends without interfering with the proper ventilation.

To these ends the invention consists in certain novel features of construction, substantially as hereinafter fully described, and pointed out in the claims, and as shown by the accompanying drawings, in which—

Figure 2:
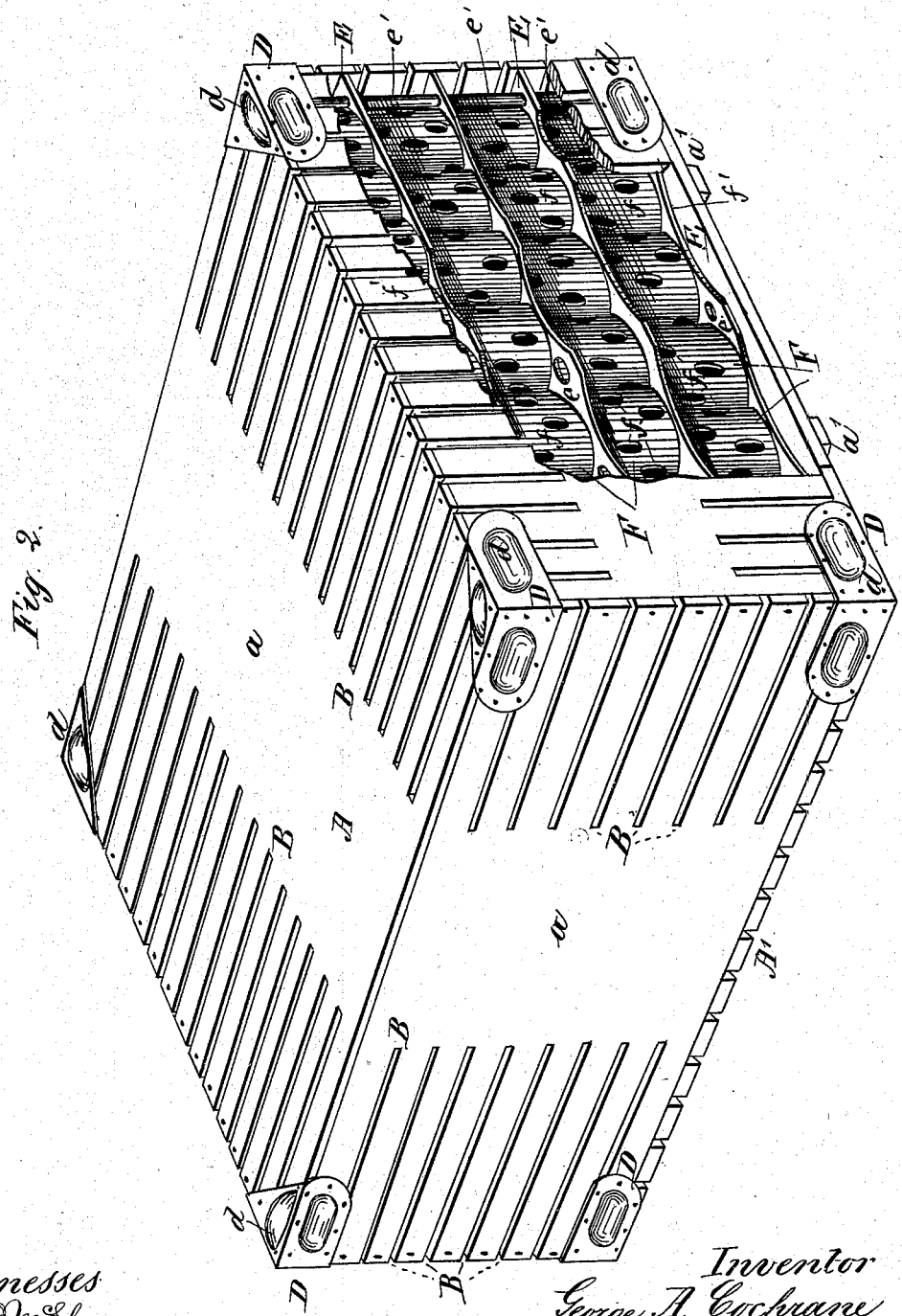

Figure 1 is a perspective view of my improved crate, a portion being broken away to show one arrangement of cells and trays. Fig. 2 is a like view, the crate being turned bottom upward, a portion being broken away to show another arrangement of cells. Fig. 3 is a vertical transverse section of the crate. Figs. 4 and 5 show the blank and the corner-piece made therefrom detached. Fig. 6 is a perspective view of one of my improved trays with the pockets or cells shown open. Fig. 7 is a like view of the same with the pockets or cells closed, and Fig. 8 is an under side view of the tray.

Similar letters of reference indicate like parts in all the figures of drawings.

A is the box, which in practice I preferably make of such size as to be conveniently carried by a man of average strength—that is to say, of size and weight when filled not to exceed ninety pounds.

I have found that a proportion of the losses sustained in shipping articles such as described arise from the necessity of handling packages too heavy to be carried. For this reason I prefer to make the boxes of convenient size, and, as set forth, preferably square, because in such form they can be carried with greater ease, and also because in this form such packages can be more economically stored and the articles more economically packed therein, as far as space is concerned.

In the construction of the box I employ boards *a* of suitable or convenient width, which are cut to the proper length. After cutting the boards to the required length I form them in bundles of twelve, or more or less, and cut the ventilating slots or slits B into the edges thereof by means of a gang of saws. I preferably make these ventilating-slots B at each end of the board of a length equal to one-third of the length of said board, so that two-thirds thereof will be provided with openings. The number of such slots B will depend upon the nature of the articles to be packed therein.

It will be seen that when the box A is completed, as shown in Fig. 1, it will be provided upon every side with ventilating-slits for the perfect drainage of the deleterious gases emanated from its contents.

The four lower corners of the box are each provided with a spacing-piece, D, made from a sheet-metal blank of the form shown in Fig. 5. By means of a suitable die the projections or swells $d$ are formed into the blank. The part $d'$ is then bent at right angles on the lines 1, and after that the part $d^2$ is bent at right angles to the part $d'$ on line 2, forming the corner-piece, as shown in Fig. 4.

The four upper corners are provided with corner-pieces D, having but two faces, and swells $d$, as shown, and are applied to the box in such manner that when the lid A' is secured in place one edge of the said corner-pieces will be flush with the upper face of said lid.

By means of this construction and arrangement of corner-piece the corners of the lid are protected from wear, and to prevent close contact of the lid with the floor, or with the lid of another crate when turned toward each other, I apply to said lid A' two spacing-strips, $a'$, that perform the same functions as the swells $d$.

The swells or projections extend outward sufficiently to prevent close contact of the crates with the floor upon which they rest, and also between themselves when piled, thus leaving air-spaces all around the boxes.

The articles are packed in the boxes on perforated trays E—that is to say, on trays each provided with such a number of perforations, openings, or air-passages $e$ as to prevent the obstruction of the circulation of air among the articles.

When the articles are inclosed in cells that are not connected with one another or with the tray, or in cells of different shape, or when small fruit—such as strawberries—are packed in cavities or pockets formed in said trays, each strawberry in a separate pocket or cavity, then the said trays are or may be provided at each corner and at other convenient points with spacing pins or supports $e'$ of a length equal to or a little greater than the thickness of the article supported upon said trays, and on which a second tray may rest without coming into contact with said articles. Each of the trays is provided with or supports a series of cells, F, provided with ventilating apertures or notches $f$, the strips forming the cells being so arranged as to project beyond the outer cells, as shown in Fig. 1, and form air-spaces $f'$ between said cells and the walls of the box; or the pockets or cells may be arranged or connected with the tray so that the latter will form the spaces $f'$, as shown in Figs. 2, 6, and 7. The cells and trays are or may be made of any suitable material, such as cardboard, straw-board, veneer, or other cheap and flexible or yielding material. This material is or may be made water and acid proof by any of the well-known means, such as water and acid proof varnishes or paints. When the crates are to be returned to the shipper I prefer to protect the trays and cells from impregnation of the fruit-juices by coating them with a water and acid proof substance, and this also permits of their being scoured or washed previous to packing other fruit in them.

It will be seen that by means of the construction of box, and the combination therewith of trays and cells, as described, such box may be turned upon any of its sides without thereby endangering its contents or obstructing the thorough ventilation. This is of great importance in storing fruit, especially the more luscious fruits, which, when resting a certain length of time in the same position, become settled—that is to say, the part that supports the weight of the fruit becomes flattened or bruised, the tissues or cells are ruptured, and rapid decomposition ensues.

If the crates are turned from one side to the other from time to time, each time the crate is turned the fruit will correspondingly change its position—that is to say, a fresh surface will support the weight thereof—and if this turning is effected before the tissues or cells of the fruit have been ruptured the partly settled or flattened surface will generally swell out again, or at least be prevented from decomposing. This is especially the case where proper precautions are taken to remove the fruit from contact with the deleterious gases emanated therefrom.

For shipment and sale of the higher-priced and more delicate fruit, either by producers or wholesale dealers who possess a variety of such fruits, I employ the fancy trays shown in Figs. 6 and 7. These trays E have attached thereto a number of variously-shaped cells, F, to accommodate different kinds and sizes of fruit, and each tray is provided with two ribbons, cords, or other analogous supporting means, E', whereby the trays may be held and carried by the purchaser. Each cell or pocket F is provided with a paper-lace cover, F', that, when folded, will leave air-passages, and at the same time serve as an elastic packing to hold the smaller fruit from being too much jarred, and all the cells may be covered by like paper-lace covers connected with the edges of the outer rows of cells or with the edges of the trays. These trays and cells are intended to be given with the fruit to the purchaser, and are preferably made of the finer kind of white card-board, provided with perforations arranged to form ornamental or geometrical figures, as shown in Fig. 8, so that when purchased the tray may be placed upon the table.

In practice, however, and with a view to economy, I shall make these trays of papier-maché, paper, or wood-pulp, preferably the latter, and form them by means of molds. By means of this construction of fruit-tray I overcome great inconveniences to the purchaser, and also avoid the danger of the fruit being bruised in transit from the dealer to the place of consumption.

The tray can be readily carried, and avoids the necessity of dumping the fruit in a basket that may contain various other articles bought in market, which latter may bruise or taint the fruit, and I provide a cheaper article than the baskets in which assorted fruit has heretofore been sold, and an article of more artistic or tasteful appearance.

Having now described my invention, what I claim, and desire to secure by Letters Patent, is—

1. A crate apertured on all sides, and provided with means for keeping every side of the crate apart from the floor and from other crates, in whatever position the crate is placed, whereby a vertical ventilation through such crate is secured, substantially as and for the purpose specified.

2. A crate apertured on all sides, and provided with means for keeping every side of the crate apart from the floor and from other crates, in whatever position the crate is placed, in combination with similarly-apertured trays and cells, whereby a vertical ventilation through such cells, trays, and crate is secured, substantially as and for the purpose specified.

In testimony whereof I affix my signature in presence of two witnesses.

GEO. A. COCHRANE.

Witnesses:
HENRY ORTH,
WM. A. McELWEE.